2,967,885

PREPARATION OF HALOGENATED ANILIDES OF SALICYLIC ACID

Vincent Lamberti, Hackensack, N.J., assignor to Lever Brothers Company, New York, N.Y., a corporation of Maine No Drawing. Filed Aug. 22, 1958, Ser. No. 756,536

9 Claims. (Cl. 260—559)

The present invention is directed to improvements in the process for preparing halogenated anilides of salicyclic acid having the following structural formula:

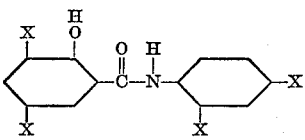

wherein X is a halogen such as bromine or chlorine, or hydrogen, and at least two of the substituents are halogen. These compounds possess useful properties including germicidal activity. In many cases they retain this activity in the presence of soap and hence have been incorporated in soap as germicidal agents. The brominated compounds are especially useful as soap germicides and hence the following description will be directed principally to such derivatives.

The brominated salicylanilides may be prepared by starting with salicylanilide which is a commercially available material and suspending it in hot water containing a wetting agent. The free bromine is then added to the stirred suspension, whereupon the halogen is substituted in one or both of the aromatic nuclei of the salicylanilide, i.e., in the 2',3,4', and/or 5 positions. The substitution of the bromine for hydrogen results in the formation of hydrogen bromide which, of course, produces a reaction mixture having a low pH, i.e., well below 4 and if an alkaline bleach (referred to hereinafter) is not used, more likely pH 1–2. Furthermore, the bromine is generally used in slight excess so that the product contains some free bromine.

In order to remove the unreacted bromine a reducing agent (or bleach) such as sodium bisulphite may be added, which also has the effect of raising the pH to about 2–2.5. To neutralize most of the acid in the product, it has been the practice to add caustic until the pH has been raised to the desired level. After neutralizing the acid and removing the excess bromine, the water is separated from the slurry by filtration and/or decantation and the brominated salicylanilide is dried.

Although a satisfactory commercial product can be made by the foregoing procedure the color of the product is generally somewhat pink and it would be desirable to have a white product. However, known procedures for purifying the halogenated salicylanilide have either failed to produce a product having a satisfactory color, or have required additional purification steps.

It is an object of the present invention to improve the process of preparing halogenated salicylanilides so that the product will be lighter in color.

It is another object of the invention to provide such a process that does not require procedures that are difficult to carry out or are expensive, such as solvent treatment.

Other objects and advantages of the invention will appear hereinafter.

According to the present invention the halogenated salicylanilide is treated in the form of an aqueous slurry having a pH substantially below 4 with a soluble alkali metal phosphate, thereby to raise the pH of the slurry to a value of at least about 4 but not greater than about 7. Thereafter the halogenated salicylanilide is separated from the liquid of the slurry.

Among the phosphates that may be used for raising the pH of the slurry there are included trisodium orthophosphate and tetrasodium pyrophosphate. These are representative of the alkaline phosphates which I prefer to use in the process. However, other phosphates having lower alkalinities may be used as long as they are capable of raising the pH to the desired level. Such materials are known in the art. Furthermore, soluble phosphates of other alkali "metals" such as potassium and ammonium may be employed as well as other types of phosphates.

As previously noted, the hydrogen bromide that is inherently formed in the halogenation process causes the pH of the bromosalicylanilide to be very low, i.e., of the order of 1–2.5. The function of the phosphate is to remove this hydrogen bromide and thereby raise the pH to at least about 4 which will be indicative of the removal of most of the hydrogen bromide. If the amount and type of the phosphate is such that the pH is about 6, substantially all of the hydrogen bromide will have been removed. Hence, it will ordinarily not be necessary to use more phosphate. Furthermore, if the pH goes above 6 some of the brominated salicylanilide tends to go into solution. However, in certain cases it may be desired to use amounts of phosphates which will raise the pH to about 7. Higher pH's are usually avoided because they require excessive quantities of phosphates and hence tend to make the process more costly.

After the slurry has been treated with the phosphate, the liquid associated with the solid product in the slurry is removed by any desired or suitable procedure such as decantation and/or filtration. The wet solids may be further dried in a current of air.

By suitable control of the reaction between the salicylanilide and the halogen (which per se is not part of the present invention), a major amount of product substituted in the 3,4' and 5 positions may be produced. One product that is particularly useful as a germicidal agent for soap is the 3,4',5-tribromosalicylanilide. Another useful germicide is the 2'3,4',5-tetrabromosalicylanilide. Other compounds that may be obtained and treated by the process of this invention include the 3,5 and 4',5-dibromosalicylanilides.

Although the use of a reducing agent such as a bisulfite has beeen previously mentioned as one technique for removing the unreacted bromine, other methods can be employed e.g., extensive washing, followed by or preceded by treatment with the phosphate in accordance with the present invention.

It is believed that the undesirable color of the product that is obtained when ordinary alkalies are used to neutralize the free acid present in the system with the halosalicylanilide is due to some unknown interaction between the particular alkali, the halosalicylanilide and possibly other impurities present in the system. The use of phosphates according to the present invention does not cause this color-producing reaction and, hence, results in a more desirable product. However, I do not intend to limit the invention to this particular theory.

The following examples are presented to illustrate how the invention may be carried out. However, there is no intention to limit its scope to such procedures.

Example I 26 parts by weight of salicylanilide are suspended in 305 parts of hot water containing 0.27% sodium dodecylbenzenesulfonate as a wetting agent in a glass-lined reactor. Other wetting agents may be used, if desired. 60 parts by weight of bromine are then added at the rate of 1 part per minute to the suspension while stirring. The reaction temperature is maintained at 57° C. by cooling during the first portion of the reaction and heating during the last portion. The product slurry is heated and stirred at reaction temperature for an additional hour after the bromine addition has ended in order to allow time for the reaction to be completed. The pH of the slurry is about 1. 400 parts of water are added and the batch is allowed to settle for 8–12 hours. Supernatant liquor is decanted and the residual slurry is treated with 102 parts of a 0.2% sodium bisulfite solution while stirring to remove unreacted bromine and thereby remove some of the color from the product. The pH after adding the bisulfite is about 2. While stirring the slurry, 11.1 parts of trisodium phosphate ($Na_3PO_4 \cdot 12H_2O$) dissolved in 33 parts of warm water are added. The pH of the slurry at this point is 4.2. The slurry is filtered through a stainless steel filter press and washed thoroughly with water. The filter cake while still in the press is blown with an air stream to dry it as much as possible. The wet cake is then dried in an oven at 55° C. The yield of product is 52 parts of 3,4',5-tribromosalicylanilide having a light cream color which is a very desirable color. The product prepared by a similar process using sodium hydroxide instead of trisodium phosphate to neutralize the HBr has a pronounced pink color.

*Example II*

A comparison is obtained between the effect of various alkaline agents in neutralizing the hydrobromic acid that is present with the tribromosalicylanilide in an aqueous slurry, by adding various alkaline agents to a slurry of 1 part tribromosalicylanilide (prepared by the procedure described in Example 1) in 6 parts of water containing a sufficient amount of added hydrobromic acid to result in a pH of 2.5. These are the conditions prevailing when tribromosalicylanilide is prepared by bromination of salicylanilide in an aqueous slurry followed by bleaching with sodium bisulfite. The amount of alkaline agent added is sufficient to adjust the pH to a value within the range of 4–5. In this way the effect of sodium hydroxide, sodium carbonate, trisodium orthophosphate and tetrasodium pyrophosphate as neutralizing agents are observed. The following table shows the result of such tests.

| Neutralization Agent | Final pH of Slurry | Color of Suspended Solids After Settling |
| --- | --- | --- |
| Sodium hydroxide | 4.7 | pink. |
| Sodium carbonate | 4.7 | less pink than with sodium hydroxide. |
| Trisodium orthophosphate | 4.3 | white. |
| Tetrasodium pyrophosphate | 4.0 | white |
| Control—no neutralizing agent | 2.5 | white. |

Although certain embodiments of the invention have been described, it will be apparent that there are many modifications and equivalents within the teaching of the specification. Accordingly, I desire to include all such modifications and equivalents within the scope of the appended claims.

I claim:
1. In the process for preparing halogenated salicylanilides having the formula

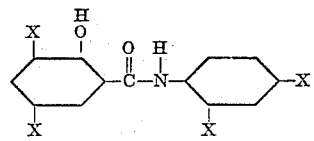

wherein X is selected from the group consisting of bromine, chlorine and hydrogen with at least two halogen substituents being present in the molecule, by treating salicylanilide with a halogen selected from the group consisting of chlorine and bromine, the improvement which comprises treating an aqueous slurry of said halogenated salicylanilide having a pH substantially below 4 with a soluble alkali metal phosphate thereby to raise the pH to a value of at least about 4, and thereafter separating the halogenated salicylanilide from the liquid associated therewith.

2. The process of claim 1 wherein the pH is raised to value within the range 4 to 6.
3. The process of claim 1 wherein the halogenated salicylanilide is a bromosalicylanilide.
4. The process of claim 1 wherein the halogenated salicylanilide is 3,4',5-tribromosalicylanilide.
5. The process of claim 1 wherein the halogenated salicylanilide is 2',3,4',5-tetrabromosalicylanilide.
6. The process of claim 1 wherein the phosphate is an alkaline salt of an acid of the group consisting of orthophosphoric acid and pyrophosphoric acid.
7. The process of claim 1 wherein free bromine is present in the aqueous slurry, and the slurry is treated with a reducing agent to remove said free bromine.
8. The process for preparing halogenated salicylanilides having the formula

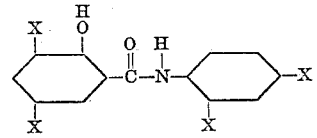

wherein X is selected from the group consisting of chlorine, bromine and hydrogen with at least two halogen substituents being present which comprises preparing an aqueous suspension of salicylanilide and a wetting agent, reacting the salicylanilide in said suspension with free halogen selected from the group consisting of chlorine and bromine in an amount sufficient to add at least two halogen substituents per molecule, removing unreacted halogen from the suspension, adding to the suspension an alkaline phosphate of an acid of the group consisting of orthophosphoric and pyrophosphoric acids in an amount to raise the pH of the slurry to a value of at least 4 and thereafter separating the halogenated salicylanilide from the liquid associated therewith.

9. The process for preparing brominated salicylanilide having the formula

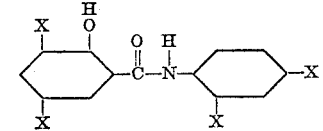

wherein X is chosen from the group consisting of hydrogen and bromine with at least two bromine atoms being present which comprises preparing an aqueous suspension of salicylanilide and a wetting agent, reacting the salicylanilide in said suspension with free bromine in an amount sufficient to add at least two bromide substituents per molecule thereby forming hydrogen bromide, adding a reducing agent to the suspension to remove unreacted bromine, and adding to the suspension an alkaline phosphate of an acid of the group consisting of orthophosphoric and pyrophosphoric acids in an amount to neutralize the hydrogen bromide and raise the pH of the slurry to a value of at least 4, and thereafter separating the brominated salicylanilide from the liquid associated therewith.

References Cited in the file of this patent

FOREIGN PATENTS 1,071,910   France _____ Mar. 10, 1954